（12）United States Patent
Koga et al.

(10) Patent No.: US 8,928,995 B2
(45) Date of Patent: Jan. 6, 2015

(54) LENS BARREL AND IMAGING DEVICE (75) Inventors: Akira Koga, Osaka (JP); Daisuke Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/561,080

(22) Filed: Jul. 30, 2012

(65) Prior Publication Data

US 2013/0033761 A1  Feb. 7, 2013

(30) Foreign Application Priority Data

Aug. 1, 2011 (JP) .................................. 2011-168107
Jun. 6, 2012 (JP) .................................. 2012-128548

(51) Int. Cl.
*G02B 15/14* (2006.01)
*G02B 7/10* (2006.01)
*G02B 7/02* (2006.01)

(52) U.S. Cl.
CPC ................ *G02B 7/102* (2013.01); *G02B 7/022* (2013.01)
USPC ............................. 359/696; 359/703; 359/819

(58) Field of Classification Search
USPC .......... 359/827–828, 823–824, 694–709, 819
See application file for complete search history.

(56) References Cited

U.S. PATENT DOCUMENTS

| | | | |
|---|---|---|---|
| 4,456,356 A | 6/1984 | Okabe | |
| 4,917,846 A | 4/1990 | Takase et al. | |
| 5,222,407 A | 6/1993 | Sekiguchi | |
| 5,592,250 A | 1/1997 | Shimizu | |
| 5,701,208 A | 12/1997 | Sato et al. | |
| 6,008,954 A | 12/1999 | Shintani et al. | |
| 6,434,331 B1 | 8/2002 | Araoka et al. | |
| 6,498,624 B1 | 12/2002 | Ogura et al. | |
| 6,580,571 B2 | 6/2003 | Sasaki et al. | |
| 7,099,573 B2 | 8/2006 | Ikemizo | |
| 7,280,287 B2 | 10/2007 | Yamane | |
| 7,680,409 B2 | 3/2010 | Kurosawa | |
| 7,690,851 B2 | 4/2010 | Yamane et al. | |
| 7,758,261 B2 | 7/2010 | Ohkuma | |

(Continued)

FOREIGN PATENT DOCUMENTS

JP  S62-259816 A  11/1987
JP  H05-034563 A  2/1993

(Continued)

OTHER PUBLICATIONS

Notice of Allowance and Allowability dated Dec. 11, 2013 in a co-pending U.S. Appl. No. 13/561,081.

(Continued)

*Primary Examiner* — Ricky Mack
*Assistant Examiner* — Daniele Manikeu
(74) *Attorney, Agent, or Firm* — Shinjyu Global IP (57) ABSTRACT

The imaging device includes a lens barrel, which itself includes a first frame, a second frame rotatably supported by the first frame, a lens mount including a contact face that comes into contact with the main body of a camera body, and a linking portion for linking the lens mount and the first frame on the outside of the contact face, with at least part of the second frame being disposed between the linking portion and the contact face along the optical axis direction; and an imaging element for converting an optical image formed by the lens barrel into image data.

17 Claims, 9 Drawing Sheets

(56) References Cited

U.S. PATENT DOCUMENTS

| | | |
|---|---|---|
| 7,792,422 B2 | 9/2010 | Mori |
| 7,864,241 B2 | 1/2011 | Iwasaki |
| 7,898,745 B2 | 3/2011 | Matsui et al. |
| 7,929,049 B2 | 4/2011 | Yamane et al. |
| 8,031,418 B2 | 10/2011 | Shiga |
| 8,264,556 B2 | 9/2012 | Hasuda |
| 8,405,922 B2 | 3/2013 | Terahara |
| 8,665,540 B2 | 3/2014 | Ito |
| 8,693,861 B2 | 4/2014 | Koga |
| 8,712,230 B2 | 4/2014 | Koga |
| 2009/0002847 A1* | 1/2009 | Nakada et al. ............... 359/702 |
| 2010/0013939 A1 | 1/2010 | Ohno et al. |
| 2010/0014172 A1* | 1/2010 | Koyama et al. ............. 359/739 |
| 2010/0060995 A1* | 3/2010 | Yumiki et al. ............... 359/704 |
| 2010/0165493 A1* | 7/2010 | Fukino et al. ............... 359/823 |
| 2012/0188660 A1* | 7/2012 | Fahlbusch et al. ........... 359/824 |
| 2012/0200768 A1 | 8/2012 | Ito |
| 2013/0044381 A1 | 2/2013 | Ito |
| 2013/0077949 A1 | 3/2013 | Koga |
| 2013/0100540 A1 | 4/2013 | Koga |

FOREIGN PATENT DOCUMENTS

| | | |
|---|---|---|
| JP | H08-110456 A | 4/1996 |
| JP | 2000-304999 A | 11/2000 |
| JP | 2003-057522 A | 2/2003 |
| JP | 2010-038932 A | 2/2010 |

OTHER PUBLICATIONS

The Official Communication for co-pending U.S. Appl. No. 13/561,083, issued Feb. 7, 2014.

The Office Action from co-pending U.S. Appl. No. 13/561,081 issued on Jun. 6, 2014.

* cited by examiner

LENS BARREL AND IMAGING DEVICE

CROSS-REFERENCE TO RELATED APPLICATIONS

This application claims priority under 35 U.S.C. §119 to Japanese Patent Application No. 2011-168107, filed on Aug. 1, 2011 and Japanese Patent Application No. 2012-128548, filed on Jun. 6, 2012. The entire disclosure of Japanese Patent Application No. 2011-168107 and Japanese Patent Application No. 2012-128548 are hereby incorporated herein by reference.

BACKGROUND

1. Technical Field

The technology disclosed herein relates to a telescoping lens barrel.

2. Background Information

Imaging devices that produce image data about a subject have rapidly gained popularity in recent years. A lens barrel for adjusting the focal distance is mounted in these imaging devices. Examples of known imaging devices include cameras with an integrated lens and those with an interchangeable lens. A lens barrel is built into an integrated type of camera. A camera with an interchangeable lens includes a camera body and a lens barrel that can be mounted to the camera body.

A conventional lens barrel is disclosed in Japanese Laid-Open Patent Application 562-259816, for example. With this lens barrel, the focal distance can be adjusted, or the desired main subject put into focus, by moving a lens group along the optical axis direction. Here, the lens group is moved manually along the optical axis direction. Also, the lens group is moved along the optical axis direction by rotating a helicoid barrel to adjust the focal distance.

SUMMARY

With respect to the lens barrel configuration discussed above, it has been discovered that there is a limit to how much the total length of the lens barrel can be reduced to achieve a more compact size.

It is an object of the technology disclosed herein to provide a telescoping lens barrel that can be made more compact in its stowed state.

The lens barrel disclosed herein is a lens barrel that supports a lens. This lens barrel comprises a lens mount, a first frame, a linking portion, and a second frame. The lens mount includes a contact portion that comes into contact with a body mount of a camera body. The first frame is fixed to the lens mount. The linking is inserted into the first frame along the optical axis direction of the lens, from the lens mount side toward the first frame. This links the lens mount and the first frame to each other. The second frame is disposed more to the inner peripheral side than the linking portion, and is supported rotatably with respect to the first frame. The end of the second frame on the lens mount side is disposed within the region in which the linking portion is disposed along the optical axis direction of the lens.

A lens barrel comprising the above constitution can be more compact. Also, an imaging device equipped with this lens barrel can be similarly made more compact.

The technology disclosed herein makes it possible to provide a lens barrel and an imaging device that can be made more compact.

BRIEF DESCRIPTION OF THE DRAWINGS

Referring now to the attached drawings, which form a part of this original disclosure.

DETAILED DESCRIPTION OF EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

First Embodiment

1. External Appearance

Figure 1:
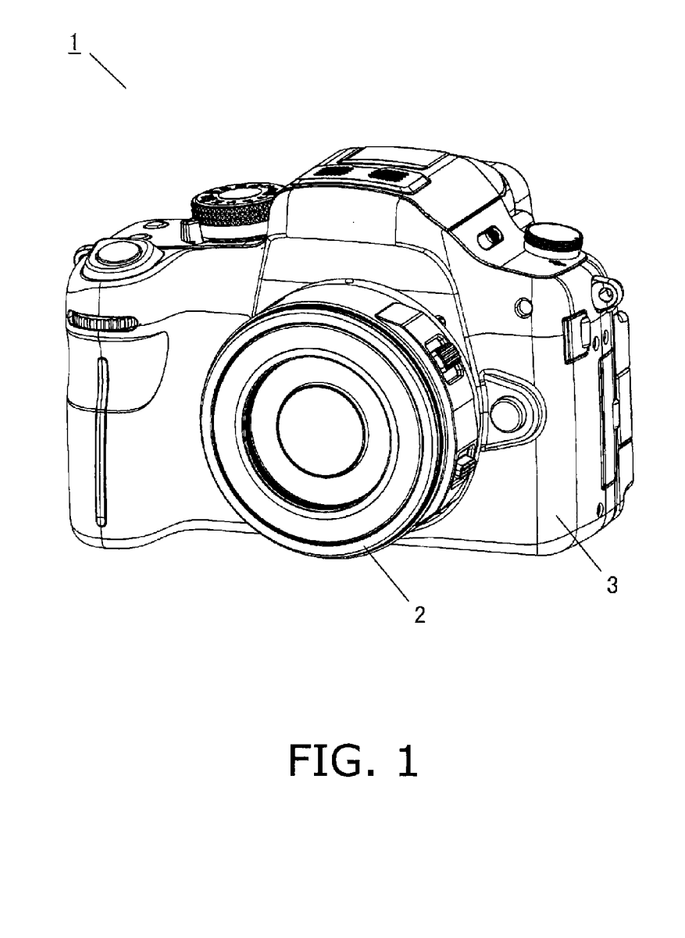
FIG. 1 is an oblique view of an imaging device 1.

FIG. 1 is an oblique view of an imaging device 1. The imaging device 1 is an interchangeable lens type of digital camera, and mainly comprises a camera body 3 and a lens barrel 2 that is removably mounted to the camera body 3.

Figure 2:
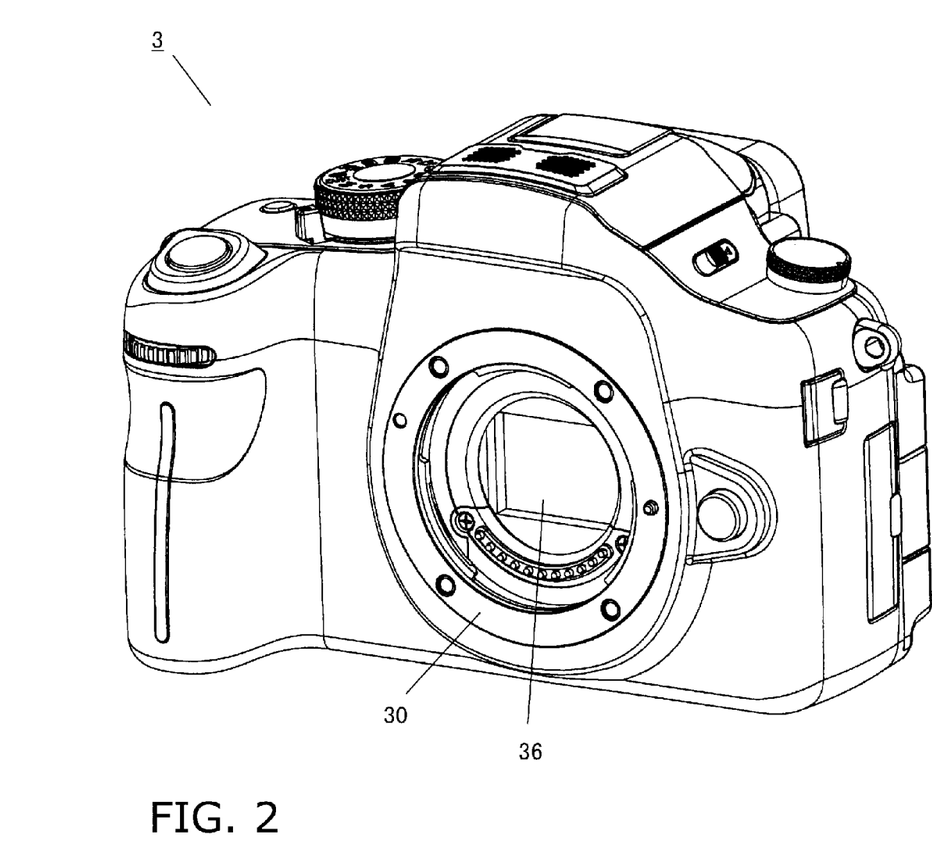
FIG. 2 is an oblique view of a camera body 3.

FIG. 2 is an oblique view of the camera body 3 when the lens barrel 2 has been removed. The camera body 3 comprises a body mount 30, which is the portion where the lens barrel 2 is attached, and an imaging element 36 that captures an optical image formed by the lens barrel 2 and converts it into image data.

Figure 3A:
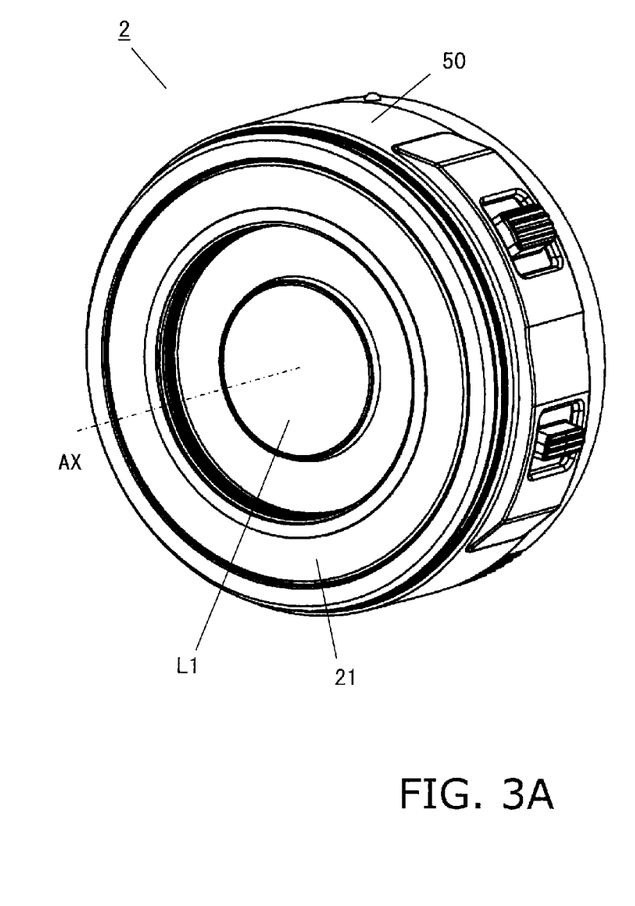
FIG. 3A is an oblique view of a lens barrel 2 (front face side)
Figure 3B:
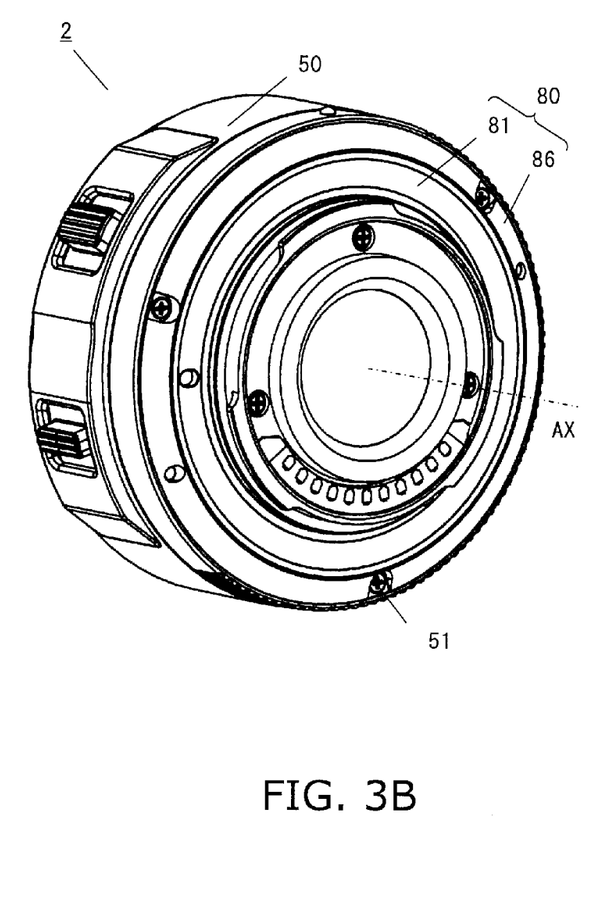
FIG. 3B is an oblique view of the lens barrel 2 (rear face side)

FIG. 3 consists of oblique views of the lens barrel 2. FIG. 3A is an oblique view as seen from the subject side, while FIG. 3B is an oblique view as seen from a lens mount 80 side. The lens barrel 2 is mechanically and electrically connected to the camera body 3 via the lens mount 80 and the body mount 30 (see FIG. 2). The lens mount 80 is an annular member mounted to the body mount 30 of the camera body 3. The lens mount 80 includes a contact face 81 and an outer peripheral face 86. The contact face 81 is a face that comes into contact with the body mount 30 when the lens barrel 2 has been attached to the camera body 3. The outer peripheral face 86 is provided more to the outer peripheral side than the contact face 81. The outer peripheral face 86 is formed more to the subject side than the contact face 81.

The lens barrel 2 includes an outer frame 50 around its outermost periphery. The outer frame 50 is linked by linking portions 51 (such as screws) to the lens mount 80. The linking portions 51 are passed through the lens mount 80 in a direction facing from the lens mount 80 side to the outer frame 50 and are inserted into the outer frame 50, along the optical axis direction of the lens, thereby linking the lens mount 80 and the outer frame 50.

The lens barrel 2 supports a lens. In FIG. 3, an optical axis AX is displayed as the optical axis of the lens. The optical axis direction is a direction that lies along the optical axis AX, and is a direction that is parallel to the optical axis AX.

2. Vertical Cross section of Lens Barrel 2

Figure 4:
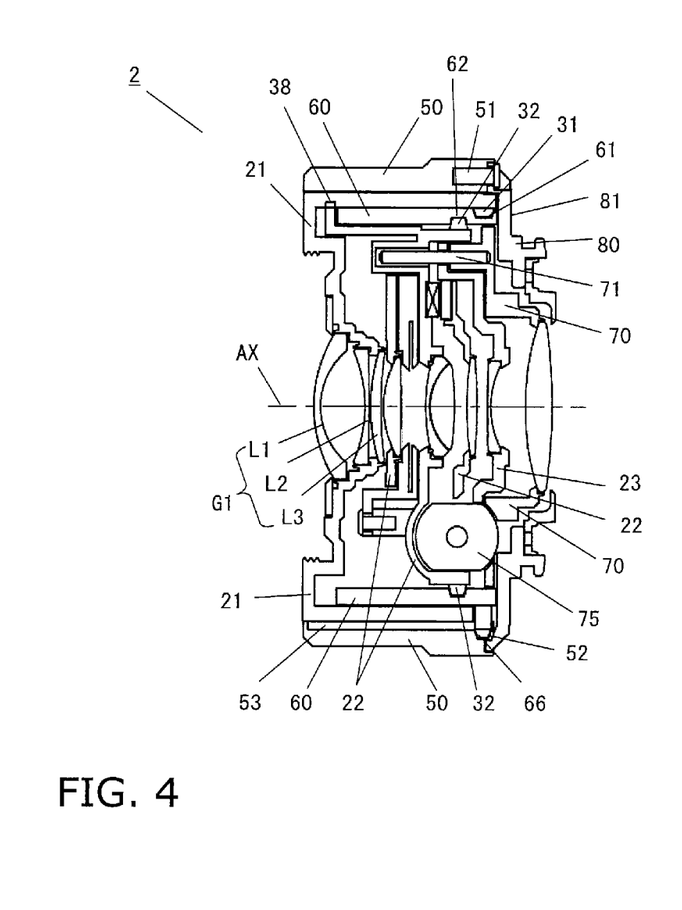
FIG. 4 is a cross section of the lens barrel 2 in its stowed state.

FIG. 4 is a vertical cross section of the lens barrel 2 when the cam frame 60 has moved all the way to the lens mount 80 side.

The outer frame 50 is fixed to the lens mount 80. The outer frame 50 supports the cam frame 60 rotatably and retractably along the optical axis direction. The outer frame 50 is a substantially cylindrical member. The fixed frame 70 is fixed to the lens mount 80.

As discussed above, the outer frame 50 is fixed by the linking portions 51 (such as screws) to the lens mount 80. The linking portions 51 are inserted a specific length into the outer frame 50. More specifically, screws (linking portions 51) of a specific length are threaded into female threads formed inside the outer frame 50. Cam grooves 52 and rectilinear grooves 53 are formed in the inner peripheral face of the outer frame 50.

The cam frame 60 includes cam followers 66 on its outer peripheral face. The cam followers 66 engage with the cam grooves 52 formed in the inner peripheral face of the outer frame 50. Consequently, when the cam frame 60 rotates with respect to the outer frame 50, the cam followers 66 move along the cam grooves 52. As a result, the cam frame 60 advances and retracts with respect to the outer frame 50. First cam grooves 61 are formed in the outer peripheral face of the cam frame 60. Second cam grooves 62 are formed in the inner peripheral face of the cam frame 60.

As shown in FIG. 4, when the cam frame 60 has moved all the way to the lens mount 80 side, the end of the cam frame 60 on the lens mount 80 side is disposed within the region in which the linking portions 51 are disposed along the optical axis direction of the lens. Specifically, the linking portions 51 and the cam frame 60 are disposed so that the linking portions 51 overlap the end of the cam frame 60 on the lens mount 80 side along the optical axis direction of the lens. In other words, the end of the cam frame 60 on the lens mount 80 side is included in the region in which the linking portions 51 are disposed as seen in a direction perpendicular to the optical axis AX of the lens. That is, in FIG. 4, the end of the cam frame 60 on the lens mount 80 side is disposed more to the lens mount 80 side than the distal ends of the linking portions 51.

The cam frame 60 supports a first lens frame 21. First cam followers 31 are formed in the first lens frame 21. The first cam followers 31 engage with the first cam grooves 61. Consequently, when the cam frame 60 rotates with respect to the first lens frame 21, the first cam followers 31 move along the first cam grooves 61. As a result, the first lens frame 21 advances and retracts with respect to the cam frame 60. When the cam frame 60 has moved all the way to the lens mount 80 side, at least part of the first cam followers 31 of the first lens frame 21 is disposed within the region in which the linking portions 51 are disposed along the optical axis direction of the lens. The first lens frame 21 supports lenses L1, L2, and L3.

The cam frame 60 supports a second lens frame 22. Second cam followers 32 are formed on the second lens frame 22. The second cam followers 32 engage with the second cam grooves 62. Consequently, when the cam frame 60 rotates with respect to the second lens frame 22, the second cam followers 32 move along the second cam grooves 62. As a result, the second lens frame 22 advances and retracts with respect to the cam frame 60. The second lens frame 22 supports lenses L4, L5, L6, and L7. An aperture unit 42 is attached to the second lens frame 22, and moves integrally with the second lens frame 22 along the optical axis direction.

The cam frame 60 includes a cylindrical main body. The cam frame 60 is disposed so that at least part of the main body of the cam frame 60 overlaps the contact face 81 as seen from the subject side. More precisely, the cam frame 60 is disposed so that at least part of the main body of the cam frame 60 overlaps on the outer peripheral side of the contact face 81 as seen from the subject side.

The fixed frame 70 supports a third lens frame 23 via a shaft 71. The third lens frame 23 is driven along the optical axis direction by a focus motor (not shown). The third lens frame 23 supports a lens L8. The fixed frame 70 supports a lens L9. A stepping motor, for example, is used as the focus motor.

A motor 75 is fixed to the fixed frame 70. The motor 75 is disposed on the inner peripheral side of the cam frame 60. The motor 75 is a drive means for rotating the cam frame 60. At least part of the motor 75 is disposed within the region in which the linking portions 51 are disposed along the optical axis direction of the lens.

In this embodiment, an example was given in which the optical system was made up of four groups of lenses, but the present technology is not limited to this.

Figure 5:
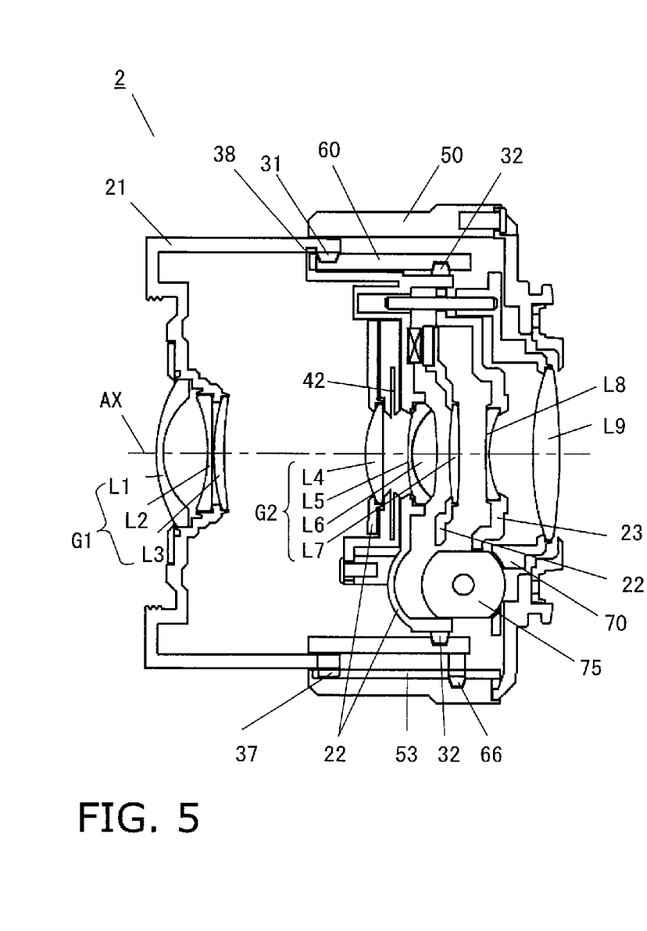
FIG. 5 is a cross section of the lens barrel 2 at the wide angle end.

FIG. 5 is a cross section showing the situation in imaging at the wide angle end, while the lens barrel 2 is in use. Since the lens barrel 2 is being used, the cam followers 66 are located more to the subject side than in the state shown in FIG. 4. Accordingly, the cam frame 60 is extended with respect to the outer frame 50.

Figure 6:
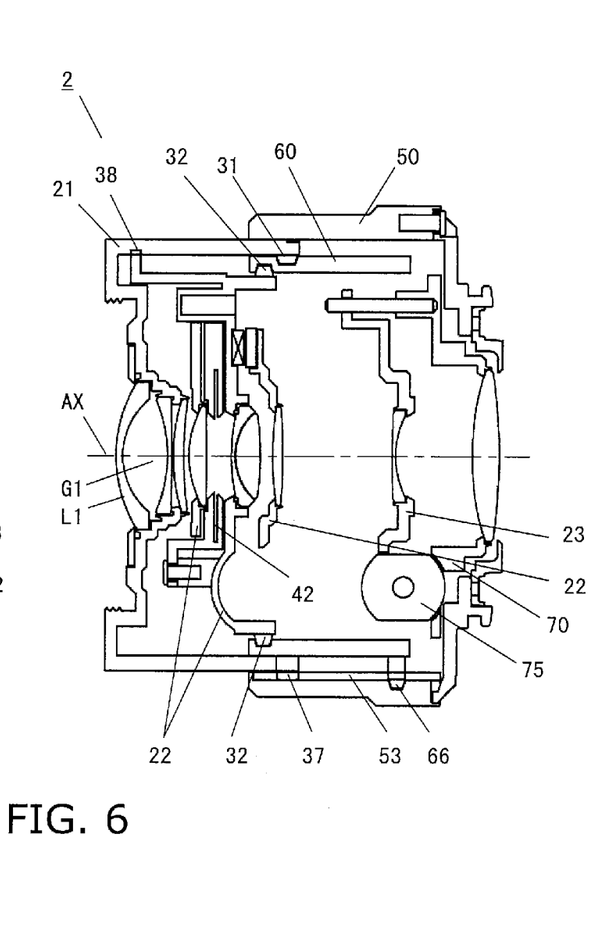
FIG. 6 is a cross section of the lens barrel 2 at the telephoto end.

FIG. 6 is a cross section showing the situation in imaging at the telephoto end, while the lens barrel 2 is in use. As shown in FIGS. 5 and 6, the state of zooming is varied by adjusting the positions of the first lens frame 21 and the second lens frame 22.

3. Cam Grooves

Figure 7A:
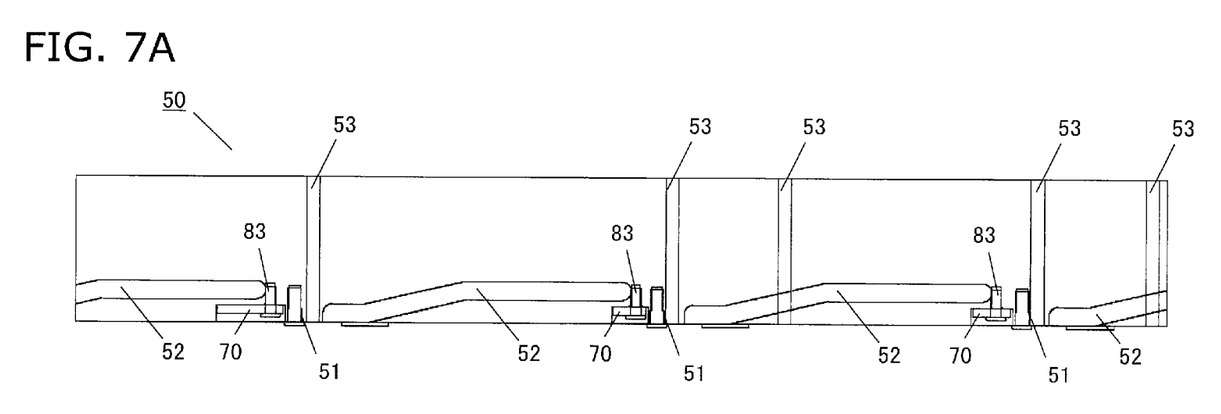
FIG. 7A is an inner peripheral development view of an outer frame 50.

FIG. 7A is a development view of the inner periphery of the outer frame 50. The rectilinear grooves 53 guides so that the first lens frame 21 does not rotate. Rectilinear protrusions 37 formed on the first lens frame 21 engage with the rectilinear grooves 53. Specifically, the rotation of the first lens frame 21 is restricted by the outer frame 50. The cam grooves 52 are provided at three locations in the inner peripheral face of the outer frame 50. The rectilinear grooves 53 are provided at five locations in the inner peripheral face of the outer frame 50.

Screws 83 pass through the lens mount 80 and the fixed frame 70 and are inserted into the outer frame 50. This fixes the fixed frame 70, the lens mount 80, and the outer frame 50 to each other. The screws 83 and the linking portions 51 are each provided at three places.

As is clear from FIG. 7A, the ends of the cam grooves 52 on the lens mount 80 are located more to the lens mount 80 side than the distal ends of the linking portions 51. In other words, the region (range) of the cam grooves 52 used during lens stowage is formed more to the lens mount 80 side than the distal ends of the linking portions 51. Consequently, when the cam frame 60 has moved all the way to the lens mount 80 side, the end of the cam frame 60 on the lens mount 80 side is disposed within the region in which the linking portions 51 are disposed along the optical axis direction of the lens. Specifically, in this case the linking portions 51 and the cam frame 60 are disposed so that the linking portions 51 overlap the end of the cam frame 60 on the lens mount 80 side along the optical axis direction of the lens. In other words, when the cam frame 60 has moved all the way to the lens mount 80 side, the end of the cam frame 60 on the lens mount 80 side is included in the region in which the linking portions 51 are disposed as seen in a direction perpendicular to the optical axis AX of the lens. Also, the three linking portions 51 are respectively disposed between the three cam grooves 52 in the peripheral direction, and do not interfere with the cam grooves 52.

Figure 7B:
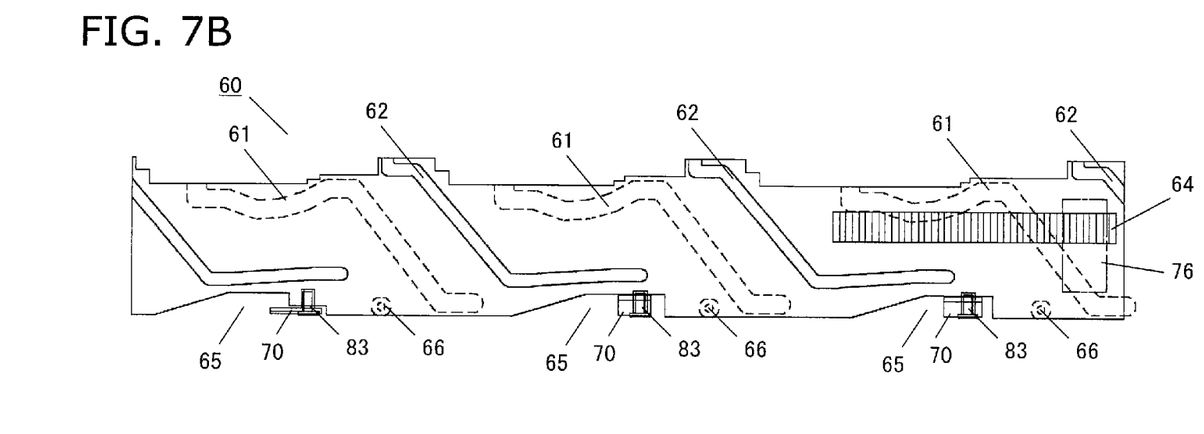
FIG. 7B is an inner peripheral development view of a cam frame 60.

FIG. 7B is a development view of the inner periphery of the cam frame 60. The second cam grooves 62 and a gear portion 64 are provided to the inner peripheral face of the cam frame 60. The gear portion 64 meshes with a gear provided to a transmission mechanism 76, and transmits the drive force of the motor 75 to the cam frame 60.

The first cam grooves 61 and the cam followers 66 are provided to the outer peripheral face of the cam frame 60.

Cut-outs 65 are provided to the end of the cam frame 60 on the lens mount 80 side. The cut-outs 65 are provided at locations at the end of the cam frame 60 on the lens mount 80 side. In the location, the cut-outs 65 do not interfere with the first cam grooves 61 and the second cam grooves 62. Specifically, the cut-outs 65 are disposed at locations that are away from the first cam grooves 61 in the peripheral direction, and are disposed at locations that are away from the second cam grooves 62 along the optical axis direction.

4. Relation Between Cam Frame 60 and Fixed Frame 70

Figures 8A, 8B:
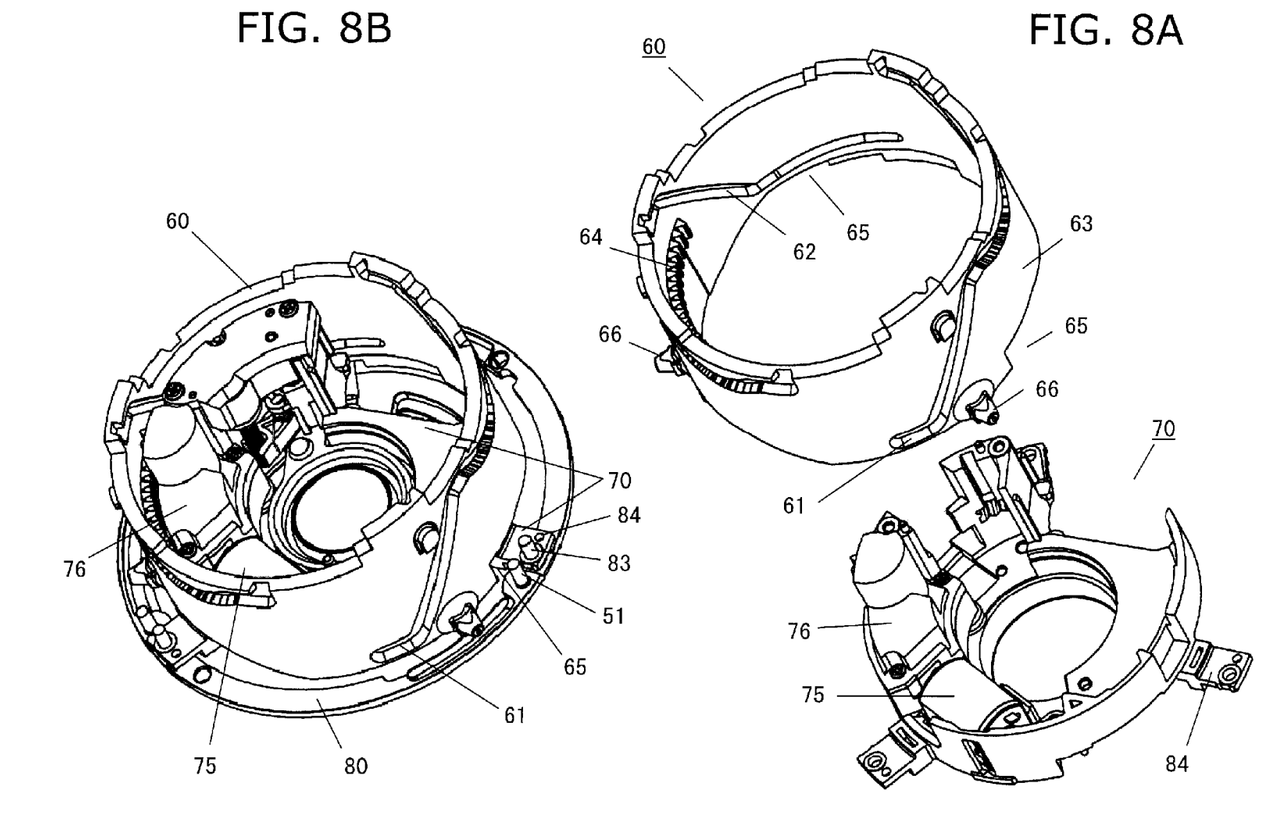
FIG. 8A is an oblique view of the cam frame 60 and a fixed frame 70.
FIG. 8B is an oblique view of the interior of the lens barrel 2.

FIG. 8A is an exploded oblique view of the cam frame 60 and the fixed frame 70. The fixed frame 70 comprises fixing portions 84 extending from the inner peripheral side toward the outer peripheral side. The fixing portions 84 are provided at three places around the outer periphery. The linking portions 51 and the fixing portions 84 are each disposed at three places, substantially equidistantly spaced apart in the peripheral direction. The motor 75 and the transmission mechanism 76 are mounted to the inner periphery of the fixed frame 70. The transmission mechanism 76 transmits the rotational drive force of the motor 75 to the cam frame 60.

FIG. 8B is an oblique view of the state when the cam frame 60 and the fixed frame 70 have been assembled on the lens mount 80. FIG. 8B shows the cam frame 60 when it is all the way on the lens mount 80 side. In this state, the cut-outs 65 are located at the places where the fixing portions 84 are disposed. Consequently, the fixing portions 84 can be disposed on the outer peripheral side of the cam frame 60 without interfering with the cam frame 60. The lens mount 80, the fixing portions 84, and the outer frame 50 are fixed by the screws 83, but since their fixed portions are on the outer peripheral side of the cam frame 60. Even when the cam frame 60 has moved all the way to the lens mount 80 side, the end of the cam frame 60 on the lens mount 80 side is disposed within the region in which the screws 83 are disposed along the optical axis direction of the lens. Accordingly, the cam frame 60 can be stowed in a more compact state.

Figure 9:
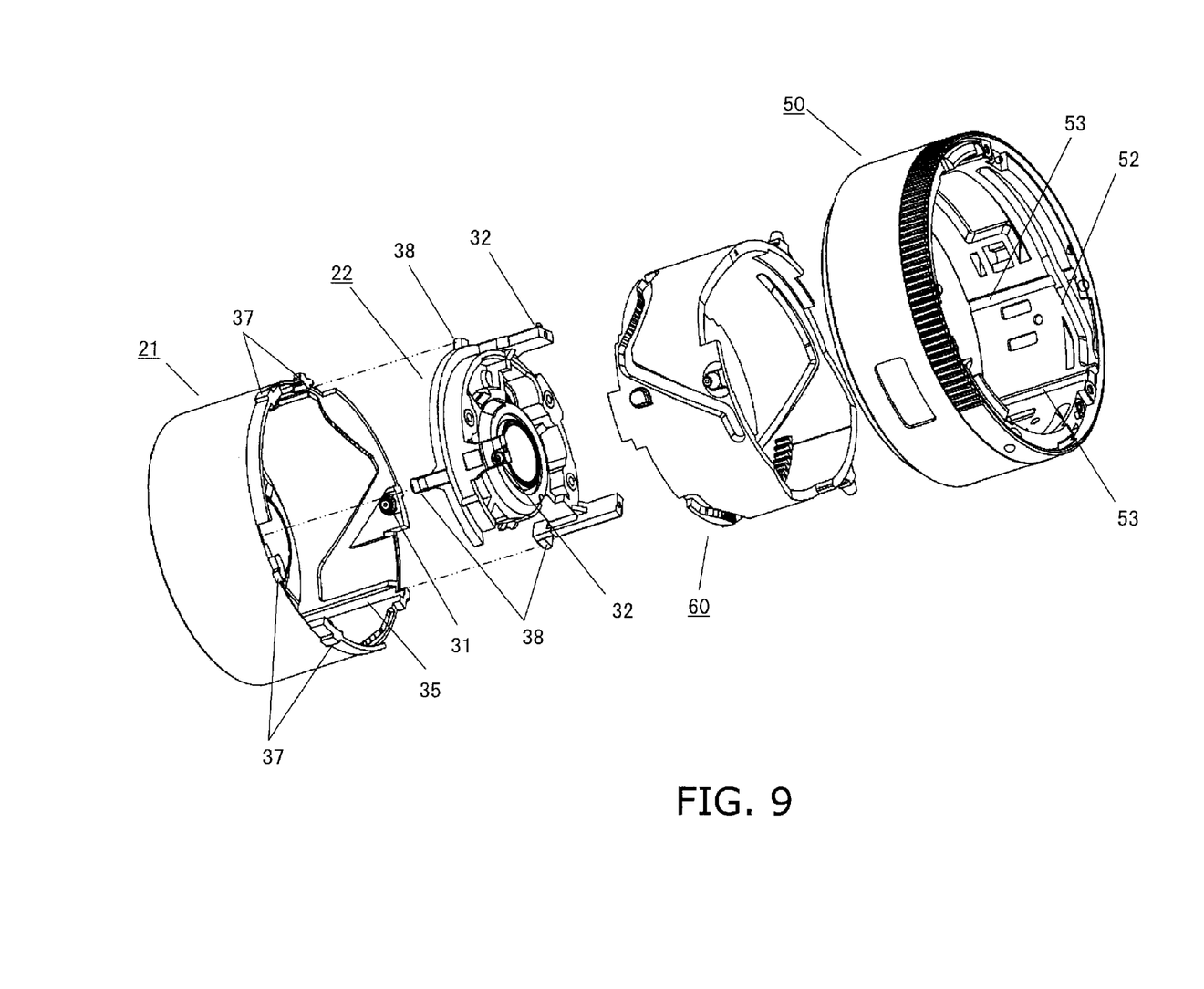
FIG. 9 is a part development view of the lens barrel 2.

FIG. 9 is a development view of the parts of the lens barrel 2.

The cam frame 60 supports the first lens frame 21. The first cam followers 31 are formed in the first lens frame 21. The first cam followers 31 engage with the first cam grooves 61. Consequently, when the cam frame 60 rotates with respect to the first lens frame 21, the first cam followers 31 move along the first cam grooves 61. As a result, the first lens frame 21 advances and retracts with respect to the cam frame 60. The cam grooves 52 and the rectilinear grooves 53 are formed on the inner peripheral side of the outer frame 50. The rectilinear protrusions 37 formed on the first lens frame 21 engage with the rectilinear grooves 53. This restricts the first lens frame 21 so that it does not rotate.

Three first group rectilinear grooves 35 are provided on the inner peripheral side of the first lens frame 21. Second group rectilinear protrusions 38 are formed at three places on the outer peripheral side of the second lens frame 22. The three second group rectilinear protrusions 38 of the second lens frame 22 are respectively inserted into the three first group rectilinear grooves 35. Consequently, rotation of the second lens frame 22 is restricted by the first lens frame 21. The second group rectilinear protrusions 38 are disposed more to the subject side than the cam frame 60.

The first lens frame 21 and the second lens frame 22 are moved along the optical axis direction by rotation of the cam frame 60.

5. Conclusion (1) The lens barrel 2 in this embodiment comprises the lens mount 80, the outer frame 50, the linking portions 51, and the cam frame 60. The lens barrel 2 supports a lens. The lens mount 80 includes a contact face 81 that comes into contact with the body mount 30 of the camera body 3. The outer frame 50 is fixed to the lens mount 80. The linking portions 51 are inserted into the outer frame 50 along the optical axis direction of the lens, from the lens mount 80 side toward the outer frame 50. This links the lens mount 80 and the outer frame 50. The cam frame 60 is disposed more to the inner peripheral side than the outer frame 50, and is supported rotatably with respect to the outer frame 50. The end of the cam frame 60 on the lens mount 80 side is disposed within the region in which the linking portions 51 are disposed along the optical axis direction of the cam frame 60.

Consequently, the end of the cam frame 60 on the lens mount 80 side does not interfere with the linking portions 51. Accordingly, the lens barrel 2 can be more compact in a state in which the cam frame 60 is stowed inside the outer frame 50.

(2) With the lens barrel 2 in this embodiment, the cam frame 60 is disposed more to the inner peripheral side than the outer frame 50, and is supported retractably with respect to the outer frame 50. The end of the cam frame 60 on the lens mount 80 side is disposed within the region in which the linking portions 51 are disposed along the optical axis direction of the lens.

Consequently, the end of the cam frame 60 on the lens mount 80 side does not interfere with the linking portions 51. Accordingly, the lens barrel 2 can be more compact in a state in which the cam frame 60 is stowed inside the outer frame 50.

(3) With the lens barrel 2 in this embodiment, when the cam frame 60 has moved all the way to the lens mount 80 side, the end of the cam frame 60 on the lens mount 80 side is disposed within the region in which the linking portions 51 are disposed along the optical axis direction of the lens.

Consequently, even when the cam frame 60 has moved all the way to the lens mount 80 side, there will be no interference between the linking portions 51 and the end of the cam frame 60 on the lens mount 80 side. Accordingly, the lens barrel 2 can be more compact in a state in which the cam frame 60 is stowed inside the outer frame 50.

(4) With the lens barrel 2 in this embodiment, the cam frame 60 includes a cylindrical main body 63. At least part of the main body 63 is disposed so as to overlap the contact face 81 when seen from the subject side.

Consequently, the motor 75 can be disposed without interfering with a second lens group G2 and the eighth lens L8, or enlarging the interior space of the cam frame 60. Also, the cam frame 60 can be moved to the lens mount 80 side. Accordingly, the overall length of the lens barrel 2 is shorter, and the focal distance can be adjusted electrically.

(5) With the lens barrel 2 in this embodiment, the first cam grooves 61 or the second cam grooves 62 are formed in the outer peripheral face or the inner peripheral face, respectively, of the cam frame 60. The first cam followers 31 or the second cam followers 32 engage with the first cam grooves 61 or the second cam grooves 62, respectively.

When the cam frame 60 has moved all the way to the lens mount 80 side, at least part of the first cam followers 31 of the first lens frame 21 is disposed within the region in which the linking portions 51 are disposed along the optical axis direction of the lens.

Consequently, the first lens frame 21 can be moved to the lens mount 80 side. Accordingly, the lens barrel 2 can be more compact in a state in which the cam frame 60 is stowed inside the outer frame 50.

(6) The lens barrel 2 in this embodiment further comprises the motor 75 and a transmission mechanism for transmitting the rotational drive force of the motor 75 to the cam frame 60. The motor 75 is disposed on the inner peripheral side of the cam frame 60, and at least part of the motor 75 is disposed within the region in which the linking portions 51 are disposed along the optical axis direction of the lens.

Consequently, parts such as the aperture unit 42 can be efficiently disposed in the space on the subject side of the motor 75. This allows the overall length of the lens barrel 2 to be reduced.

(7) The lens barrel 2 in this embodiment comprises the fixed frame 70 to which the motor 75 is mounted. The fixed frame 70 includes the fixing portions 84 extending from the inner peripheral side to the outer peripheral side. The fixed frame 70 is linked to the outer frame 50 by the fixing portions 84. The cut-outs 65 are provided to the end of the cam frame 60 on the lens mount 80 side, at the portions where there are no cam grooves 61 or 62. When the cam frame 60 is all the way to the lens mount 80 side, the cut-outs 65 are located at the places where the fixing portions 84 are disposed.

Consequently, the cam frame 60 can move to the lens mount 80 side without interfering with the fixed frame 70. This allows the overall length of the lens barrel 2 to be reduced.

As shown in FIG. 9, the second group rectilinear protrusions 38 of the second lens frame 22 are inserted into the first group rectilinear grooves 35 on the inner peripheral side of the first lens frame 21. Consequently, parts for restricting the rotation of the second lens frame 22 do not need to be provided separately to the outer frame 50, so the number of parts needed can be reduced.

Also, the first lens frame 21 is disposed on the outside of the cam frame 60, the second lens frame 22 is disposed on the inside of the cam frame 60, and the second group rectilinear protrusions 38 of the second lens frame 22 are inserted into the first group rectilinear grooves 35 on the inner peripheral side of the first lens frame 21. Consequently, parts for restricting the rotation of the second lens frame 22 do not need to be provided separately on the inside of the cam frame 60. Accordingly, there is no need for space in which to dispose these members inside the cam frame 60. This allows the space inside the cam frame 60 to be utilized more efficiently. Specifically, since parts such as the motor 75 can be disposed in this space, the lens barrel 2 can be made more compact.

(8) With the imaging device 1 in this embodiment, the above-mentioned lens barrel 2 is mounted to the camera body 3, which includes imaging element for capturing an optical image formed by the lens barrel 2, and converting the image into image data. This allows the imaging device 1 to be made more compact.

Second Embodiment

A second embodiment of the present technology will be described. Those portions having substantially the same function as the portions in the first embodiment discussed above will be numbered the same and will not be described again in detail.

Figure 10:
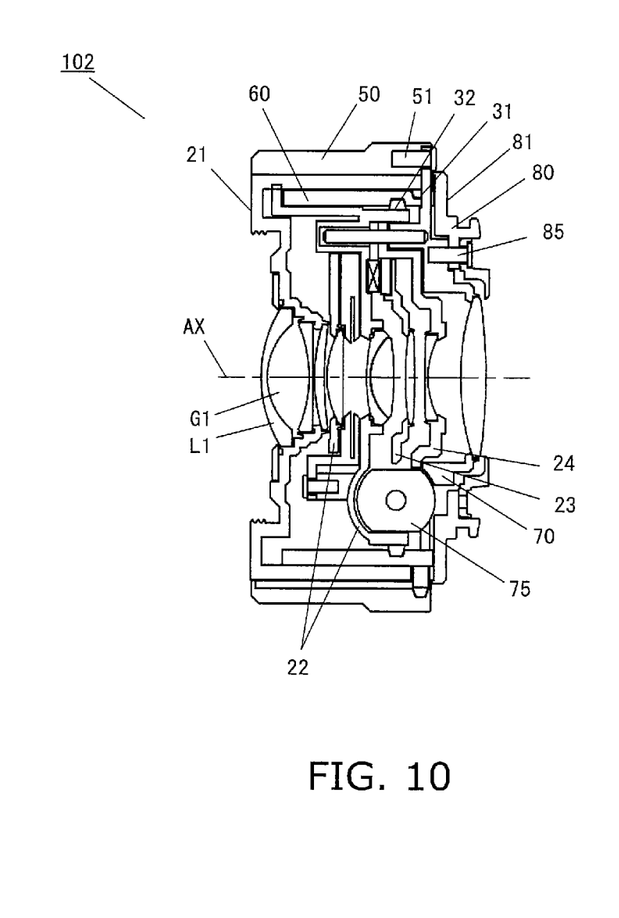
FIG. 10 is a cross section of a lens barrel 102 in its stowed state.

FIG. 10 is a cross section of a lens barrel 102 in the second embodiment.

The outer frame 50 is lined to the fixed frame 70 via the linking portions 51. The linking portions 51 are disposed on the outside of the contact face 81. The fixed frame 70 is linked to the lens mount 80 by screws 85, and the screws 85 are disposed on the inside of the contact face 81. Part of the cam frame 60 is disposed between the contact face 81 and the linking portions 51 along the optical axis direction. Part of the first cam followers 31 and part of the motor 75 are disposed between the contact face 81 and the linking portions 51 along the optical axis direction.

Again with a configuration in which the fixed frame 70 is disposed between the outer frame 50 and the lens mount 80, and the fixed frame 70 is fixed to the outer frame 50 by the linking portions 51, the effect of reducing the overall length of the lens barrel can be obtained just as in the first embodiment.

Other Embodiments

The present technology is not limited to or by the embodiments given above, and various modifications and alterations are possible without departing from the gist of the technology.

Those portions having substantially the same function as the portions in the first and second embodiments discussed above will be numbered the same and will not be described again in detail.

(1) In the above embodiments, an imaging device was described by using the imaging device 1 as an example, but the imaging device is not limited to being the imaging device 1. For example, the imaging device 1 can capture both still and moving pictures, but the imaging device may be one that captures only still pictures, or one that captures only moving pictures.

(2) In the above embodiments, a lens barrel was described by using the lens barrel 2 as an example, but the lens barrel is not limited to being the lens barrel 2. For example, the lens barrel may be one that is used in an integrated type of imaging device, rather than an interchangeable lens barrel.

(3) In the above embodiments, the motor 75 was described as an example, but the motor 75 is not limited to being a DC motor, and may instead be another type of motor (such as a stepping motor).

(4) In the above embodiments, the linking portions 51 were linked with screws, but the linking method is not limited to screws. For example, linked may be accomplished by adhesive bonding, press-fitting, or another such method. The configuration may also be such that the lens mount 80 and the linking portions 51 are integrated.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the lens barrel and the imaging device. Accordingly, these terms, as utilized to describe the present technology should be interpreted relative to the lens barrel and the imaging device.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further technologies by the applicant, including the structural and/or functional concepts embodied by such feature(s). Thus, the foregoing descriptions of the embodiments according to the present technology are provided for illustration only, and not for the purpose of limiting the technology as defined by the appended claims and their equivalents.

Industrial Applicability

The lens barrel described above allows for a reduction in size, and is therefore useful in the field of imaging devices.

What is claimed is:
1. A lens barrel that supports a lens, comprising:
a lens mount including a contact portion that comes into contact with a body mount of a camera body;
a first frame configured to be fixed to the lens mount, the first frame including a cam groove formed in an inner peripheral side of the first frame;
a linking portion configured to link the lens mount and the first frame, the linking portion being inserted into the first frame parallel to an optical axis direction of the lens, from the lens mount side toward the first frame,
the linking portion including a distal end, the distal end being an end portion of the linking portion farthest from the lens mount;
a second frame configured to be movably supported along the optical axis direction with respect to the first frame,
the second frame including a first end and a cam follower, the first end being an end of the second frame closest to the lens mount,
the cam follower formed on an outer peripheral side of the second frame;
a first distance between at least a portion of the cam groove and the lens mount in a direction parallel to the optical axis direction; and
a second distance between the distal end of the linking portion and the lens mount in a direction parallel to the optical axis direction;
wherein the first end of the second frame on the lens mount side is disposed within the region in which the linking portion is disposed along the optical axis direction of the lens,
and the first distance is shorter than the second distance.
2. The lens barrel according to claim 1, wherein
when the second frame has moved to the lens mount side, the end of the second frame on the lens mount side is disposed within the region in which the linking portion is disposed along the optical axis direction of the lens.
3. The lens barrel according to claim 1, wherein
the second frame includes a cylindrical main body, and
at least part of the main body is disposed so as to overlap the contact portion when viewed from the subject side.
4. The lens barrel according to claim 1, further comprising:
a lens frame, wherein
the second frame includes a cam groove in the outer peripheral face or inner peripheral face,
the lens frame includes a cam follower that engages the cam groove, and
when the second frame has moved to the lens mount side, at least part of the cam follower of the lens frame is disposed within the region in which the linking portion is disposed along the optical axis direction of the lens.
5. The lens barrel according to claim 1, further comprising:
a motor; and
a transmission mechanism configured to transmit the rotational drive force of the motor to the second frame, wherein
the motor is disposed on the inner peripheral side of the second frame, and
at least part of the motor is disposed within the region in which the linking portion is disposed along the optical axis direction of the lens.
6. The lens barrel according to claim 5, further comprising:
a fixing frame includes a fixing portion extending from the inner peripheral side to the outer peripheral side, and on which the motor is mounted, wherein
the fixing frame is linked to the first frame by the fixing portion,
a cut-out is formed in the second frame at the end on the lens mount side, and
when the second frame is disposed on the lens mount side, the cut-out is disposed at the position where the fixing portion is disposed.
7. The lens barrel according to claim 4, further comprising:
a first lens frame including a first cam follower that engages with a cam groove in the outer peripheral face of the second frame; and
a second lens frame including a second cam follower that engages with a cam groove in the inner peripheral face of the second frame, wherein
the rotation of the first lens frame is restricted by the first frame,
the rotation of the second lens frame is restricted by the first lens frame; and
the first lens frame and the second lens frame are moved along the optical axis direction by the rotation of the second frame.
8. An imaging device, comprising:
the lens barrel according to claim 1; and
an imaging element configured to capture an optical image formed by the lens barrel, and convert the optical image into image data.

9. A lens barrel that supports a lens, comprising:
a lens mount including a contact portion that comes into contact with a body mount of a camera body;
a first frame configured to be fixed to the lens mount, the first frame including a cam groove formed in an inner peripheral side of the first frame;
a linking portion configured to link the lens mount and the first frame, the linking portion being inserted into the first frame parallel to an optical axis direction of the lens, from the lens mount side toward the first frame,
the linking portion including a distal end, the distal end being an end portion of the linking portion farthest from the lens mount;
a second frame configured to be movably supported along the optical axis direction with respect to the first frame, and to move along the optical axis direction while rotating around the optical axis direction,
the second frame including a first end and a cam follower,
the first end being an end of the second frame closest to the lens mount,
the cam follower formed on an outer peripheral side of the second frame;
wherein the first end of the second frame is able to be closer to the lens mount than the distal end of the linking portion in a direction parallel to the optical axis direction.

10. The lens barrel according to claim 9, further wherein:
the cam follower is able to be closer to the lens mount than the distal end of the linking portion in a direction parallel to the optical axis direction.

11. The lens barrel according to claim 9, further wherein:
the first end of the second frame is configured to be able to be disposed in an overlapping region as the linking portion in the optical axis direction.

12. The lens barrel according to claim 9, further wherein:
the second frame further includes a cylindrical main body, and
at least a portion of the main body is configured to be disposed overlapping the contact portion when viewed from the subject side.

13. The lens barrel according to claim 9, further comprising:
a lens frame including a cam follower,
wherein the second frame includes a cam groove in the outer peripheral face or inner peripheral face,
wherein the cam follower of the lens frame is configured to engage the cam groove of the second frame, and
at least a portion of the cam follower of the lens frame is configured to be able to be disposed overlapping the linking portion in a direction parallel to the optical axis direction.

14. The lens barrel according to claim 9, further comprising:
a motor disposed on an inner peripheral side of the second frame; and
a transmission mechanism configured to transmit the rotational drive force of the motor to the second frame;
wherein at least part of the motor is disposed overlapping the linking portion in a direction parallel to the optical axis direction.

15. The lens barrel according to claim 14, further comprising:
a fixing frame that includes a fixing portion;
the fixing portion extending from an inner peripheral side of the fixing frame to an outer peripheral side of the fixing frame, and linking the first frame and the fixing frame; and
a cut-out formed in the first end of the second frame;
wherein the motor is mounted to the fixing frame, and
when the second frame is disposed close to the lens mount, the cut-out is disposed at the position where the fixing portion is disposed.

16. The lens barrel according to claim 12, further comprising:
a first cam groove in the outer peripheral face of the second frame;
a second cam groove in the inner peripheral face of the second frame;
a first lens frame including a first cam follower, the first cam follower configured to engage with the first cam groove; and
a second lens frame including a second cam follower, the second cam follower configured to engage with a cam groove in the inner peripheral face of the second frame;
wherein the rotation of the first lens frame is restricted by the first frame,
the rotation of the second lens frame is restricted by the first lens frame, and
the first lens frame and the second lens frame are moved along the optical axis direction by the rotation of the second frame.

17. An imaging device, comprising:
the lens barrel according to claim 9; and
an imaging element configured to capture an optical image formed by the lens barrel, and to convert the optical image into image data.

* * * * *